Dec. 3, 1957  R. A. WILKINS  2,815,278
METHOD AND APPARATUS FOR RECOVERING THE COPPER
OF ELECTRICALLY INSULATED COPPER WIRE
Filed Jan. 20, 1954  5 Sheets-Sheet 1

INVENTOR
RICHARD A. WILKINS
BY Emery Booth Townsend
Miller & Weidner ATT'YS.

United States Patent Office 2,815,278
Patented Dec. 3, 1957

2,815,278

METHOD AND APPARATUS FOR RECOVERING THE COPPER OF ELECTRICALLY INSULATED COPPER WIRE

Richard A. Wilkins, Rome, N. Y., assignor to Revere Copper and Brass Incorporated, Rome, N. Y., a corporation of Maryland Application January 20, 1954, Serial No. 405,138

13 Claims. (Cl. 75—72)

My invention relates to recovering the copper of electrically insulated copper wire, this application being a continuation-in-part of my co-pending application Serial Number 365,413, filed July 1, 1953, now abandoned.

The invention more particularly relates to a thermal process of recovering the copper of electrically insulated copper wire and disposing of the organic and inorganic components of the insulation without formation of smoke.

In commercial practice the insulation of electrically insulated copper wire usually consists mostly of organic materials such as cotton and other vegetable fibers, synthetic fibers such as nylon and the like, bituminous compounds, natural and synthetic rubbers, other synthetic resins, and sometimes paper. These materials and substances, two or more of which are commonly present in various combinations, are subject, when heated under properly controlled conditions, to destructive distillation to reduce them to what the chemist commonly terms "fixed carbon," while certain waxes and oils and the like that may be contained in the insulation are subject to being distilled off by volatilization when the insulation is heated. It will be understood that the so-called "fixed carbon" so produced may consist wholly or mostly of elemental carbon, but not necessarily so, as it may be in the form of or mixed with other combustible carbonaceous material. For convenience of terminology such fixed carbon, other carbonaceous material, and mixture are herein sometimes referred to as "carbon," while in the appended claims they are generically called "carbonaceous material."

Furthermore commercial electrically insulated copper wire commonly contains mineral substances such as asbestos and glass fibers, and clay and the like employed for loading the rubber, such loading materials often amounting to as much as 40% by weight of the insulation. Also the insulation may contain small amounts of zinc oxide used for pigmentation and loading, and may contain small amounts of lead oxide and antimony compounds for vulcanizing the rubber of the insulation and for other purposes. Further, the copper wire is commonly "tinned" with an alloy of tin and lead.

Heretofore, in recovering the copper of electrically insulated copper wire, it has been common practice when the wire is of heavy gauge to run it through stripping rolls to remove the insulation so as to recover the copper, which latter may be melted and cast into pigs for subsequent reuse or into slabs for subsequent electrolytic refining. However, with insulated copper wire in which the copper wire is of small gauge, say gauges less than about 16 Brown & Sharpe gauge, it is not commercially practical to remove the insulation by a stripping or other mechanical operation, and heretofore no practical way has been devised of recovering the copper of such wire in the form of satisfactory secondary or other metal. The attempt to burn such insulation off such small gauge wire produces a dirty product in which the copper is badly oxidized, such oxidization being particularly pronounced with small gauge stranded wire. Furthermore, such product contains all the mineral substances of the insulation, which substances mix with the oxidized copper making it difficult to recover the copper in massive form by any subsequent fire refining operation. Much of the oxidized copper is in the form of a powder and is lost in handling the product and cannot be recovered. Still further, and most objectionably, such attempt produces copious clouds of dense black strongly odorous smoke, the production of which violates the smoke prevention ordinances of most communities.

According to applicant's invention, the copper of the insulated copper wire of any gauge may be readily treated to recover a clean metal which is substantially unoxidized, while the organic and mineral substances of the insulation may be effectively disposed of without production of any substantial amount of smoke. Applicant has found that this result may be secured by subjecting the insulated copper wire to heat for driving off the volatiles of the insulation and subjecting the insulation to destructive distillation to reduce its organic components to fixed carbon, which latter characteristically coats the wire, and then burning the carbon so produced, under deoxidizing conditions with respect to copper, to melt the copper of the wire, which molten copper may be cast into pigs or slabs for subsequent reuse or refining.

The carbon produced by destructive distillation of the insulation applicant has found commonly will be from about 2 to 4 times the amount of carbon necessary to secure the requisite temperature and heat for melting the copper and effecting reduction of the organics of the insulation to carbon. Consequently the carbon so produced applicant has found may constitute actually or substantially the only fuel necessary for performance of the distilling and melting operations.

In performing the above method, by burning the carbon by use of controlled amounts of combustion air the products of combustion will consist essentially of a mixture of carbon monoxide, carbon dioxide and nitrogen, which mixture is chemically inert or reducing in respect to the hydrocarbons of the insulation, and, because of the carbon monoxide contained therein, is deoxidizing in respect to copper. Therefore, by passing these hot combustion products through a mass of the insulated copper wire, the destructive distillation may be caused to take place in an inert or reducing atmosphere with respect to such insulation and the copper. Such atmosphere will not support combustion and therefore will prevent ignition of the gaseous products of distillation while in contact with the mass. Ignition of the gaseous products of distillation, while in contact with the mass of insulated wire being distilled, or ignition of the insulation itself, it has been found will cause the formation of copious clouds of dense black smoke consisting of suspended unconsumed carbon particles, the presence of which smoke ordinarily would be highly objectionable if discharged into the atmosphere. Although it is ordinarily not feasible in commercial practice to perform the distilling and melting operations without formation of smoke of some sort from time to time, the formation of the same may be reduced to a minimum and in most instances substantially entirely avoided by normally preventing ignition of the insulation and of the mixture of gaseous products of combustion of the burning carbon with the volatiles and gaseous distillation products while such gaseous mixture is in contact with the insulation.

Such smoke as may be formed may be substantially wholly eliminated prior to discharge into the atmosphere by mixing the volatiles and gaseous products of distillation, and of combustion of the carbon, with air and burning them after they move out of contact with the mass of insulated wire being treated. This burning of the gaseous combustion and distillation products, which disposes of them, will also convert to relatively harmless antimony oxide and lead oxide any poisonous fumes of antimony and lead compounds as may be evolved during the distilling operation from antimony and lead compounds that may be contained in the insulation.

By maintaining the insulated wire being treated in the form of a column or other confined mass of sufficient height, and burning the carbon at the bottom of said mass, the hot products of combustion of such burning may be passed upward through the mass to effect, in conjunction with the heat generated by such burning, destructive distillation of the insulation, and with production of a minimum of smoke, and under some conditions no smoke at all, even when fresh wire is added to the top of said mass for maintaining its height. By maintaining such column the insulated wire charged to the top of the mass is gradually heated in a reducing atmosphere to raise its temperature as it descends toward the bottom of the mass, so as progressively to subject the insulation to destructive distillation and cause such insulation to be reduced to fixed carbon before it reaches the combustion zone adjacent the bottom of the mass.

The mineral substances, such as asbestos, clay and the like, that may be contained in the insulation may be disposed of by adding suitable fluxes, such as glass, fluorspar and the like, to the mass to form a slag while the copper is being melted. Any glass fibers contained in the insulation will likewise melt to form a slag. These slags may be tapped off separately from the copper, or the slags and copper may be tapped off together and the copper separated from the slags by stratification in a holding furnace.

Some of the tin and a substantial portion of the lead of the alloy constituting the tinned surface coating of the copper wire will volatilize to vaporous tin and lead as the tinned copper is being melted. Similarly substantially all of any zinc that may be contained in such coating will volatilize to vaporous zinc. Such vapors will ascend through the mass of wire being treated and will be converted to tin and lead oxides when the gaseous products of distillation are burned. Such zinc and lead oxides as may be contained in the insulation will be reduced by the burning carbon at the bottom of the mass to vaporous zinc and lead which likewise will ascend through the mass, and will be reconverted to zinc and lead oxides when the gaseous distillation products are burned.

Some of the metallic tin and lead of the tinned coating of the wire, and some of the zinc and lead vapors formed in the manner above described, will tend to alloy with the copper as it is melted. However, by causing the mass of insulated wire being treated to rest on a bed of carbon, which bed may be formed of carbon produced by the destructive distillation of the insulation, and introducing combustion air at a point below the interface of this bed and mass for burning the carbon descending to said bed and the bottom of said mass, and permitting the molten copper to trickle from said interface downward through the burning carbon of said bed and highly heated and incandescent carbon below the zone of combustion, the molten copper will, by the time it reaches the bottom of said bed, be at least partially fire refined to remove from it most or all tin, lead and zinc so tending to alloy with it. This fire refining of the copper occurs because as the molten copper passes through the zone adjacent the point of admission of the combustion air the tin, lead and zinc contained in the copper will be converted to oxides of the same, while any oxidization of the copper which may occur at such zone will be eliminated by the deoxidizing effect of the highly heated and incandescent carbon below such zone.

Apparatus suitable for practising the above method is illustrated in the accompanying drawings, in which.

Figures 1, 2, 3:
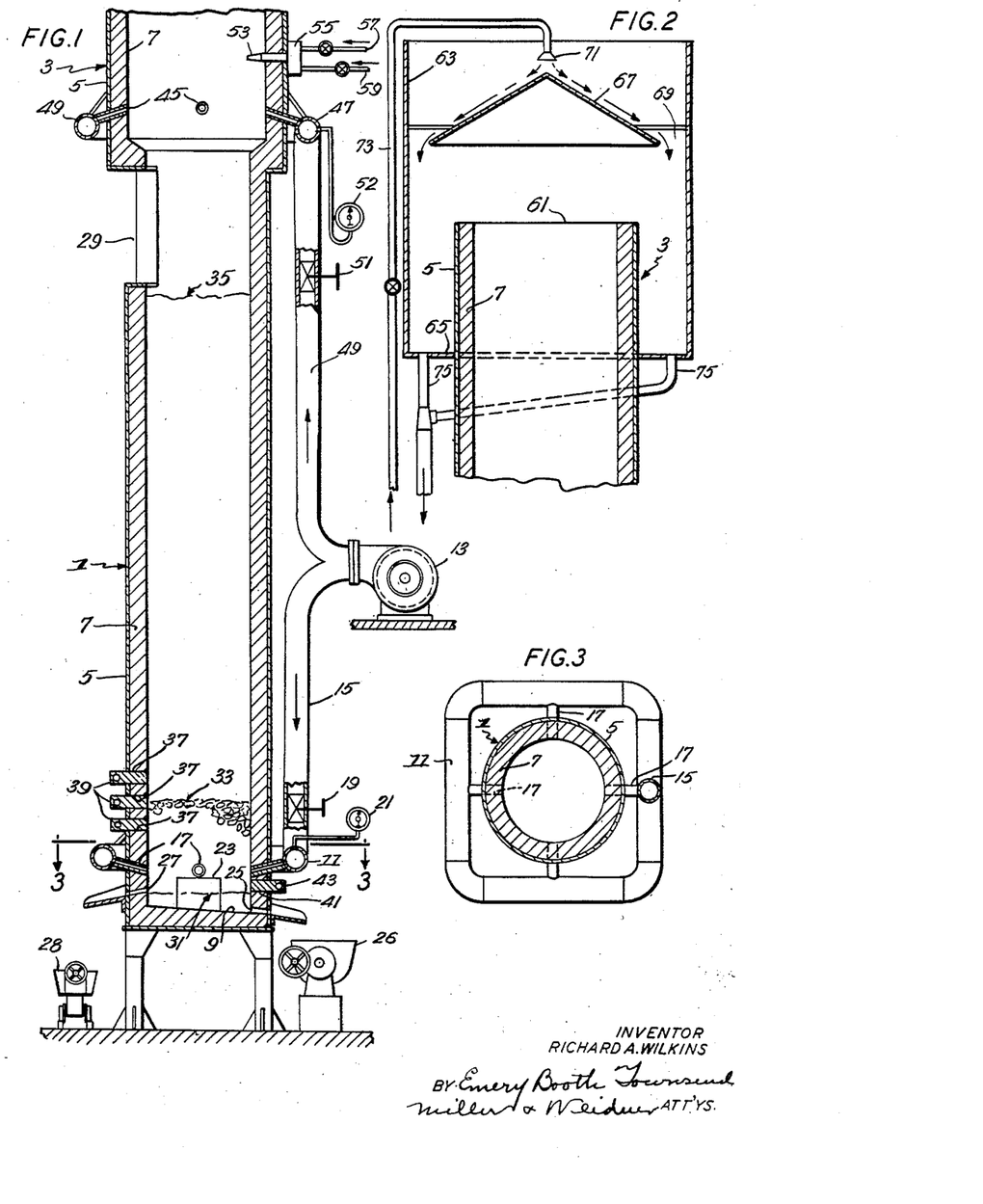
Fig. 1 is a more or less schematic view of a cupola or stack type furnace and associated equipment, the cupola being shown in vertical longitudinal section and with its upper part broken off.
Fig. 2 is a view corresponding to Fig. 1 showing the upper end portion of the cupola.
Fig. 3 is a section on the line 3—3 of Fig. 1.

Referring to the drawings, the cupola illustrated in Figs. 1 to 3 comprises a lower portion 1 which constitutes the cupola proper, and a connected upper enlarged diameter portion 3 which constitutes a combustion chamber for gaseous products discharged from said lower portion. In accordance with usual practice the cupola comprises an outer metallic casing or shell 5 having a lining 7 formed of refractory brick. Close to its bottom 9 the cupola is surrounded by a bustle pipe 11 supplied with air from a power driven blower 13 through a pipe 15. From the bustle, tuyeres 17 extend through the cupola wall for discharging combustion air into the cupola. As shown, the pile 15 is provided with a manually operated gate valve, schematically indicated at 19, for controlling the supply of air discharged from the tuyeres, a draft gauge 21 preferably being connected to the bustle pipe to give an indication of the amount of air so discharged. As further shown in Fig. 1, the cupola adjacent its bottom is preferably provided with a normally closed clean out door schematically indicated at 23. Adjacent its bottom the cupola is also shown as provided with a taphole 25 for discharging molten copper into a receptacle 26 and, at a higher level, with a taphole 27 for discharging slag into a receptacle 28, these receptacles, if desired, being of the tilting type for pouring the contents therefrom. Well above its bottom the cupola is shown as provided with a charging opening or port 29.

In using the cupola according to Figs. 1 to 3 for performing the above described method, at the start of operations a small amount of charcoal may be charged into the cupola through the charging opening 29 to a level indicated by the broken line 31, the blower 13 placed in operation, and the valve 19 slightly opened to admit a small amount of air into the cupola through the tuyeres 17. This charge of charcoal may then be ignited by dropping a ball of ignited oil soaked waste through the charging opening 29 and permitting it to fall to the charcoal.

After the charcoal is ignited, broken coke or anthracite coal, preferably the former, may be gradually charged to the cupola chamber through the charging opening, which coke or coal will be ignited by the charcoal, and in this way a bed of ignited coke or coal be built up to about a level indicated by the line 33.

After the ignited coke or coal bed is formed scrap insulated copper wire may then be charged, preferably by use of a "skip" (not shown), into the cupola chamber through the charging opening to about a level indicated by the line 35. Such wire so charged may be in the form of chopper up pieces of the same, say 1 to 2 feet long, or may be in the form of small compressed bales or "cabbages" of such wire, or in the form of coils of wire which have been pulled diametrically outward at diametrically opposite points to flatten them and then their two flattened sides twisted together, all as most convenient in respect to handling the scrap wire, which latter may be available in different forms.

When the wire is charged to the cupola the supply of air to the tuyeres may be increased to raise the temperature of the coke or coal bed and initiate the destructive distillation of the insulation of the wire so that the wire at the lower part of the elongated column of wire scrap in the cupola will become incrusted with fixed carbon as the result of the distilling of the insulation. At this point the amount of air supplied through the tuyeres may again be increased further to raise the temperature at the interface of the coke or coal bed and bottom of the charge sufficiently to burn such carbon incrusting the wire and other carbon that descends with it and melt the copper, preferably this temperature being about 2300 to 2400° F. so as to secure molten copper and slag of sufficient limpidity readily to percolate through the coke or coal bed to the bottom of the cupola chamber. The valve 19 may be regulated to supply the requisite amount of air to the tuyeres 17 to cause the products of combustion resulting from burning of the carbon, and of such burning of the coke or coal as may occur, to consist essentially of carbon monoxide, carbon dioxide and nitrogen, in other words, to form a reducing or deoxidizing atmosphere in respect to copper so that the copper will not be oxidized, as hereinbefore explained. The bed of charcoal and coke or coal, and of the fixed carbon which gradually replaces the charcoal and coke or coal as hereinafter more fully explained, is of such depth and the tuyeres so positioned and the amount of air supplied the tuyeres are such that some of the air from the tuyeres will circulate through the portion of the bed below them with the result that such portion will be heated by radiation and conduction from the high temperature combustion zone adjacent the interface of the bed and mass of wire, aided by some burning of said portion, to incandescence and to such temperature as will maintain the molten copper and slag limpid as they trickle through the bed to the bottom of the cupola.

The hot products of combustion of the burning of the carbon pass upward through the charge to cause, in conjunction with the heat generated by the burning carbon, a progressive distilling off of the volatiles of the insulation of the column of wire and destructive distillation of such insulation. The column of charge is normally maintained sufficiently high and the amount of air supplied the tuyeres such as to cause the products of combustion of the burning carbon to be sufficiently deficient in oxygen as not to cause burning of the insulation or ignition of the gaseous products of distillation of the insulation.

The molten copper may be tapped from the cupola through the taphole 25, and slag through the taphole 27, or, if desired, the taphole 27 may be omitted and both the copper and slag tapped through the taphole 25 and placed in a holding furnace to permit the lighter slag and heavier copper to separate and be separately tapped from such furnace. The molten copper recovered may, if desired, be further refined by conventional fire refining methods, such as blowing it with air to remove or substantially reduce its content of impurities such as iron, silicon, lead, tin, etc. Normally the taphole or tapholes will be maintained in open condition so that the molten copper and slag may continuously discharge from the cupola. These tapholes however may be plugged in the usual manner with removable fire clay when desired as, for example, when changing the receptacle 26 or 28.

As hereinbefore explained, normally the insulation of copper wire contains mineral substances such as clay, and commonly contains glass or asbestos fibers. Such glass fibers will melt to form a slag. The clay and asbestos fibers may be caused to form a slag by adding to the charge requisite amounts of suitable flux such as broken glass or fluorspar. It is necessary that such mineral substances be removed from the cupola as otherwise they would soon choke it.

As heretofore pointed out, the carbon resulting from the destructive distillation of the insulation will commonly be from 2 to 4 times that necessary to secure the requisite heat for melting the copper. The valve 19 may be regulated to cause all this carbon to be burned so as to maintain the level of the bottom of the column of charge substantially constant or within desired limits, while fresh insulated wire may be charged through the charging opening at such overall rate as normally to maintain the top of the charge at the desired level.

As shown in Fig. 1, the cupola adjacent the level of the bottom of the charge is provided with three vertically spaced openings 37 each normally closed by a removable plug 39 of refractory material. By removing these plugs the level of the bottom of the charge and top of the carbon bed beneath it may be determined by the operator inserting a bar through the openings 37 and "feeling" the material in the cupola chamber. The level of the top of the carbon bed may also be determined, particularly when the rate of consumption of the charge is high and provision is made for eliminating the discharge of excessive amounts of smoke as in the apparatus according to Figs. 4 to 7 hereinafter described, by discontinuing the charging operation for a while until no copper wire remains on the carbon bed, which condition can be readily determined by copper ceasing to discharge from the taphole at the bottom of the cupola, and then lowering a weight on the end of a chain through the cupola charging opening until the chain gives slack, the length of the chain payed out until slack occurs being a measure of the level of the top of the carbon bed, whereupon the charging operation may be resumed to fill the cupola with insulated copper wire to a level adjacent the charging opening and maintain it there. If the level at the bottom of the charge is found by any of these expedients to be too high the valve 19 may be opened to increase the amount of air supplied through the tuyeres 17 so as to burn at a faster rate the carbon produced by destructive distillation of the insulation. If the level is too low it may be raised by slightly closing the valve 19 to decrease the amount of air supplied through the tuyeres so as to burn the carbon at a slower rate. Experience will teach the operator the proper reading of the draft gauge 21 which will burn the carbon at the proper rate to maintain the bottom of the charge at a proper level for a considerable time. Under ordinary conditions of operation the correction of the level just mentioned need be made but about once every 24 hours, during which time said level ordinarily may rise or fall from 2 to 6 inches.

While the cupola furnace affords a very convenient means of burning off the carbon derived from distillation of the insulating material, and while such carbon is in amount more than adequate to provide the heat necessary for effecting the distilling operation and melting the copper, it has been found that this carbon being in a very fine state of subdivision causes the upper portion of the carbon bed and the excess carbon that tends to be added thereto to tend to "float" on the air blast admitted through the tuyeres and to be carried by such blast a slight but appreciable distance upward into the charge of wire. This has the effect of elevating the zone at which combustion of the carbon takes place to such extent as will reduce the temperature at the bottom portion of the carbon bed to below the melting point of copper, so that when the molten copper drips or percolates downward to the bottom portion of the bed it chills and tends to freeze and not flow freely through the taphole. This defect it has been found may be eliminated by from time to time entering into the cupola through its charging opening with the charge, or separately, small amounts of broken up solid slag, anthracite coal or coke, preferably coke, in large lumps, say lumps that will just pass a 4 inch square mesh screen. Such slag, coal or coke it has been found will form a layer of the same on the top of the carbon bed acting to hold it down and thus cause the combustion zone to be maintained at the desired level. Because the function of the added slag, coal or coke is entirely mechanical the amount thereof necessary to be added will to a large extent depend upon the dimensional characteristics of the furnace and the velocity and amount of air admitted thereto through the tuyeres. Also, because such function is mechanical and coke is lighter than anthracite coal and both are lighter than slag, a lesser weight of the coke need be employed than of the anthracite coal and a lesser weight of anthracite coal than of slag. Ordinarily, however, the amount of these materials need not exceed about 5 percent by weight of the charge. The lumps of coal or coke so added gradually burn, and the slag so added gradually melts, the molten slag trickling downward through the bed and being discharged through the taphole or tapholes at the bottom portion of the cupola. These lumps, however, before they completely burn or melt gradually descend through the bed of finely divided fixed carbon to mix with it and thus keep it porous to promote circulation or passage of air from the tuyeres through the portion of the bed below the level of the tuyeres as well as the portion of the bed above that level. Also the presence of these lumps in the portion of the bed adjacent the taphole or tapholes by mechanically making the bed of lumpy consistency acts to minimize or prevent escape of the finely divided fixed carbon through the tapholes with the molten slag and copper. The fixed carbon produced from the insulation by the distilling operation is in excess of that necessary to effect the distilling and melting operations, so that when the lumps of coal or coke are employed such fixed carbon still in substance provides all the fuel necessary for those operations.

Instead of merely burning off all the carbon in excess of that necessary to melt the copper of the insulated wire, the same may be employed for melting further copper scrap which, if desired, may be added to or mixed with the charge prior to entering it into the cupola or may be separately entered into the cupola. Such copper scrap may be in the form of chopped up large diameter insulated wire or cable from which the insulation has been stripped, or which contains insufficient insulation to produce enough carbon for melting it if it alone constituted the charge. Also such excess carbon may be used for recovering the copper from limited amounts of copper oxide scale produced by copper rolling mills. The burning of the carbon, as above explained, produces large amounts of carbon monoxide which will act to reduce such scale to copper, which latter will be melted with the copper of the wire being treated.

The operation of the cupola according to Figs. 1 to 3 may be readily discontinued and reestablished. By discontinuing the operation of the blower 13 the burning of the carbon will be discontinued and consequently the melting and distilling operations discontinued. When it is desired to reestablish operations the blower may again be placed in operation, the valve 19 partially closed to establish a reduced draft, the carbon bed reignited, and then the valve 19 again opened to establish a temperature sufficient to melt the copper. For reigniting the carbon bed the cupola shown in Fig. 1 is formed with an opening 41 normally closed by a removable plug 43 of refractory material. Upon removal of the plug a bar may be inserted through the opening 41 to form a cavity in the carbon bed, and then an ignited ball of oil soaked waste may be forced through the opening into such cavity and the plug replaced. Also the cupola may be shut down for a considerable period, say 3 or 4 hours, and kept hot and in condition for resuming operations by during that period burning the bed of carbon. This may be done by slightly opening the valve 19 to admit a small amount of combustion air into the cupola through the tuyeres for supporting combustion of the carbon, or by removing the plug 43, or opening the taphole 25, or doing both, to produce a draft of air through the bed of carbon under the draft created by the cupola acting as a stack chimney.

It has been found that ordinarily at the start or restart of operations clouds of dense black smoke may be formed before the distilling operation is effectively established. Also such clouds of black smoke will be produced if the charging operation is intentionally or inadvertently interrupted to cause the top of the charge to reach a sufficiently low level as to cause temporary ignition of the insulation, and particularly when under such low level conditions the charging operation is reestablished to add fresh charge for building up the column of wire. Furthermore, some smoke is formed during normal operations by carbon particles which are carried upward through the column of wire from the zone of destructive distillation or from the bed of carbon below the column of wire, especially under conditions of very strong draft from the tuyeres, and also the gaseous products discharged from the column of wire may unavoidably at times contain particles of unconsumed insulation.

The gaseous products discharged from the top of the column of wire will commonly be at a temperature causing them to ignite when they rise to opposite the charging opening, through which opening air is being drawn by the stack effect of the upper portion 3 of the cupola. To burn completely and dispose of these gaseous products provision is made for mixing them with further combustion air while within the upper portion 3 of the cupola. As shown, said portion 3 or combustion chamber is provided for this purpose with upwardly inclined tuyeres 45 positioned slightly above the charging opening 29 for admitting air to that portion, which portion is of increased diameter so as to form so far as possible a combustion space of large capacity. The tuyeres 45 are shown as connected to a bustle pipe 47 supplied with air through a pipe 49 connected to the discharge side of the blower 13, the amount of air so supplied the bustle pipe and tuyeres being controlled and regulated by a manually operated gate valve, schematically indicated at 51, in the pipe 49. The air which is admitted through the tuyeres 45, in conjunction with the extended height of the enlarged diameter portion 3 of the cupola, forms an upward draft and mixes with the gaseous products. To insure that this mixture will be ignited in absence of the gaseous products igniting while opposite the charging opening there is preferably provided a constantly burning flame of gas discharged from the nozzle 53 positioned slightly above the tuyeres. As shown, the nozzle communicates with a mixing chamber, schematically indicated at 55, which is supplied with gas and compressed air through the valve controlled pipes 57 and 59, respectively, to form a combustible mixture which discharges from the nozzle. The gas flame may be ignited in any convenient way as, for example, by a taper in the form of an ignited ball of oil soaked waste on the end of a rod which may be inserted by the operator through the charging opening 29. The burning of the gaseous products of combustion will consume substantially all the particles causing the smoke, the products discharged from the top 61 of the cupola being ordinarily in the form of a rather faint whitish metallurgical haze caused by finely divided metallic oxide particles mostly zinc oxide. This haze is in no way objectionable if the cupola is of sufficient height as the haze will dissipate upon its traveling a very short distance from the top of the cupola after being discharged therefrom.

Sparks may be arrested, and solid particles of larger size than those forming the haze discharged from the top of the cupola may be effectively removed, by scrubbing the products being discharged from the top of the cupola with water prior to their entering the atmosphere. As shown, for this purpose at the top of the cupola according to Figs. 1 and 2 is placed an open top metallic shell 63 having a bottom wall 65, the shell extending well above the top of the cupola, and its bottom wall surrounding the cupola below the top of the latter and being welded to the metallic casing 5 of the cupola or otherwise being secured to the cupola so as to be supported thereby in a fluid tight manner. As shown, interiorly of the shell and above the top of the cupola is placed a conical deflector plate 67, such plate being coaxial with the shell and having its peripheral edges in spaced relation to the side walls of the shell so as to form an annular passage 69 for discharge from the shell of the gaseous products discharged from the top of the cupola. Above the apex of the deflector plate 67 is shown a water spray nozzle 71 supplied with water through a valve controlled pipe 73. Water sprayed downward through the nozzle flows over the upper conical side of the deflector plate and discharges over the peripheral edge of that plate in the form of a vertical cylindrical sheet of water, through which sheet the products escaping from the top of the cupola must pass before they discharge into the atmosphere. This water will extinguish sparks and wash from the gaseous products solid particles of larger size than those causing the above mentioned haze. As shown, the water mixed with such solid particles as it may contain may be drained from the bottom of the shell through pipes 75 provided for that purpose.

As an example of a satisfactory cupola according to Figs. 1 to 3, the inside diameter of the lower portion 1 thereof containing the charge may be about 4 feet, and the inside diameter of the upper portion 3 in which the gaseous products are burned about 5 feet. The bottom edge of the charging opening may be positioned about 25 feet above the bottom of the lower portion of the cupola chamber. The top of the charge may be normally maintained slightly below the lower edge of the charging opening, and the top of the coke bed initially entered into the lower portion of the chamber may be about 40 inches above the bottom of that portion, so that the column constituted by the charge of wire will normally be about 21 or 22 feet high, while the tuyeres 17 will be so positioned that they will be about 20 inches below the top of such coke bed. Such a cupola under ordinary conditions will handle about 2.5 tons per hour of copper wire of the character described without discharging any substantial amount of smoke. The capacity of the cupola may be increased by increasing the diameter of its two portions 1 and 3 without changing the other dimensions mentioned.

It will be understood that the coke or anthracite coal bed initially entered into the cupola will be gradually consumed by combustion. However, the bottom of the charge of wire may be maintained, as hereinbefore explained, at the desired level by so regulating, while the coke or coal is being consumed, the amount of air passed through the tuyeres 17 so as not to burn all the carbon produced by destructive distillation of the insulation, and thereby leave a residue of such carbon for replacing the coke or coal as it is being consumed, after which the amount of air passed through the tuyeres may be increased for burning all the carbon produced by the distilling operation so as to establish normal operation and maintain the desired level of the bottom of the charge of wire. Such replacement of the coke by the carbon will ordinarily take but a short time so that normal operation, in which there is maintained a bed of incandescent carbon instead of incandescent coke, will be speedily established.

The rate at which apparatus according to the invention will treat insulated copper wire for destructively distilling its insulation and recovering its copper will depend largely upon the cross-sectional area of the cupola chamber, while its capacity in respect to effectively disposing, with avoidance of smoke, of the gaseous products of distillation and gaseous combustion products formed by burning in the cupola the carbon resulting from such distillation will depend largely upon the capacity of the combustion chamber in respect to its burning therein such gaseous products and such solid smoke forming particles as may be contained in such gaseous products.

In the apparatus according to Figs. 1 to 3, in which the combustion chamber is formed by an enlarged diameter upward extension of the cupola proper, the capacity of such combustion chamber is limited because of the travel predominantly in a straight upward direction of the products discharged into it and resulting minimum of contact of the burning gases with such incandescent surfaces as may exist interiorly of it; and because of the mechanical and engineering difficulties which limit the diameter of such chamber. The combustion chamber of the apparatus according to Figs. 4 to 7, hereinafter described, is accordingly preferably employed because such combustion chamber may be readily made of large capacity and will turn the gaseous products discharged thereinto from a vertical to a horizontal direction of flow before discharging them into the stack, it having been found that improved combustion can be secured by, among other things, so turning the gaseous products. When the combustion chamber of the apparatus according to Figs. 4 to 7 is employed, a cupola of given size may be employed for treating the insulated copper wire at a much faster rate than with the combustion chamber according to Figs. 1 to 3, or, for a given size in respect to cubical contents of the combustion chamber and treating the insulated copper wire in the cupola in each case at the same rate, a smaller cupola may be employed if the combustion chamber employed is constructed according to Figs. 4 to 7 than if constructed according to Figs. 1 to 3.

With the combustion chamber of the apparatus shown by Figs. 4 to 7, the cupola employed may, if desired, be identical with the lower portion 1 or cupola proper of Figs. 1 to 3, but preferably is the modified form of cupola 77 shown by Figs. 4 to 7.

As shown, the cupola 77 comprises a vertically extending outer metallic shell 79 (Fig. 7) of circular cross-section, having the refractory lining 81. This shell and lining are shown as resting upon and carried by an annular plate 83 supported in elevated position by the supporting structure 85, to which plate the shell is secured as by welding it thereto.

Figure 7:
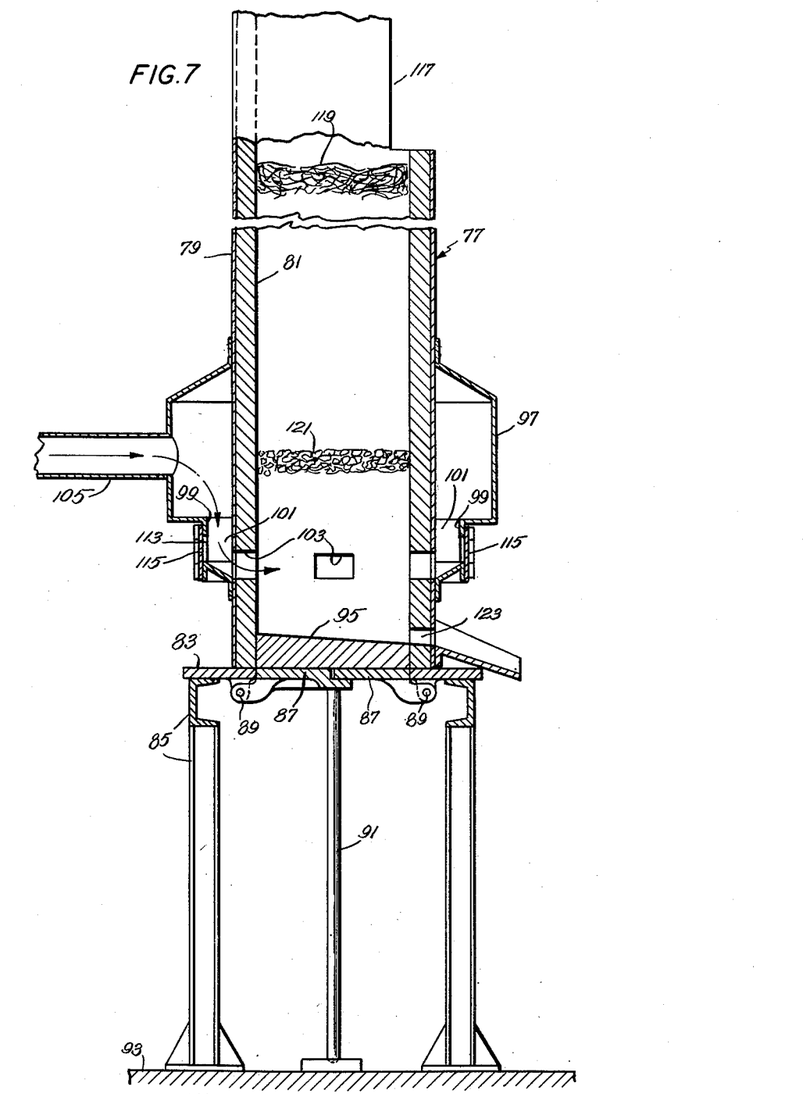
Fig. 7 is a section on the line 7—7 of Fig. 4.

As illustrated, the cupola 77 is of the "drop bottom" type, such bottom comprising the two leaves 87 hingedly connected to the plate 83 at 89 and normally held in closed position by a removable strut 91 supported at its lower end on the cupola foundation 93. Supported by the leaves 87 is the inner refractory lining 95 of the cupola bottom. Upon removal of the strut the leaves 87 will drop, and the contents of the cupola including the bottom lining 95 will fall from it.

The "bustle pipe" of the cupola of the apparatus according to Figs. 4 to 7 as shown is in the form of a shell 97 surrounding and carried by the outer cylindrical shell 79 of the cupola. As illustrated, this bustle pipe is formed at its under side with downwardly projecting portions 99 providing passages 101 for severally supplying air under pressure to the several tuyeres 103, respectively. The bustle pipe is shown as supplied with combustion air through a conduit 105 leading from the discharge side of a blower 107 (Fig. 4), the amount of air discharged into the bustle pipe being controlled by a manually operated gate valve schematically shown at 109, while the pressure of the air in the conduit 105 is indicated by the pressure gauge 111.

As further illustrated, each of the downwardly projecting portions 99 of the bustle pipe 97 is provided with an opening 113 normally closed by a horizontally swinging hinged door 115. By opening any of these doors access may be had to the adjacent tuyere for cleaning it; also, when the treatment of the insulated copper wire is discontinued for some time, one or more of the doors may be opened for admitting a draft of outside air into the cupola for maintaining a slow combustion of the carbon or other fuel bed contained therein, in that way to keep the cupola hot and ready for resumption of operations. Also by opening these doors balls of ignited oil soaked waste may be forced into the cupola for igniting the initial charcoal bed placed on its bottom or, when necessary, for reigniting the carbon bed after the cupola is shut down and operations are to be resumed.

Figure 4:
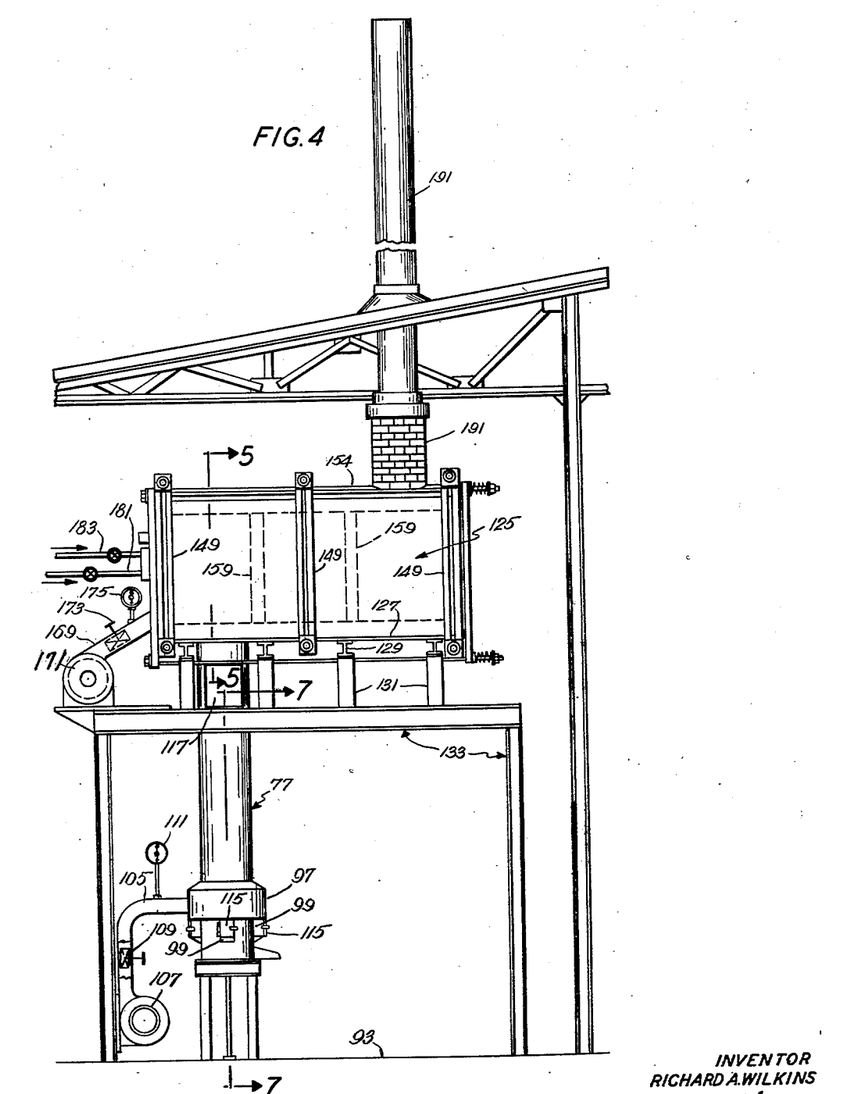
Fig. 4 is an elevation of a modified form of apparatus according to the invention.

The cupola 77, as shown, is formed adjacent its top with a normally open charging opening 117 through which insulated copper wire may be charged to maintain a column-like mass of the wire to about the level 119 slightly below the bottom of the charging opening, while the amount of air entered through the tuyeres may be such as to maintain the carbon bed to about the level 121 somewhat above the tuyeres.

As shown, the cupola 77 has a single taphole 123 adjacent its bottom, through which taphole both the molten copper and molten slag may be discharged together into a container, in which container they may be readily separated as hereinbefore described.

The combustion chamber 125 of the apparatus according to Figs. 4 to 7 is shown as carried by a rectangular metal plate 127 resting upon elongated horizontal I-beams 129, which latter are supported on posts 131 carried by the elevated framework 133. Upon the plate 127 is supported the floor 135 of the combustion chamber, which floor is preferably formed of heat refractory material such as fire brick. Each end wall of the combustion chamber is shown as comprising an inner layer 137, preferably of heat refractory fire brick, and an outer layer 139 preferably of heat insulating brick, these two layers resting upon the supporting plate 127. Each side wall of the chamber also is shown as formed of an inner layer 141, resting upon the combustion chamber floor 135, and an outer layer 143 resting upon the plate 127, these layers being preferably of heat refractory fire brick and heat insulating brick, respectively. Supported on the end and side walls is the arched roof of the combustion chamber, this roof comprising an inner layer 145 and an outer layer 147 formed of the same material as the corresponding layers of the side and end walls. As shown, the vertical walls of the combustion chamber are reinforced by the pairs of opposite buckstays 149, the stays of each pair being connected by the tie rods 151.

Figure 5:
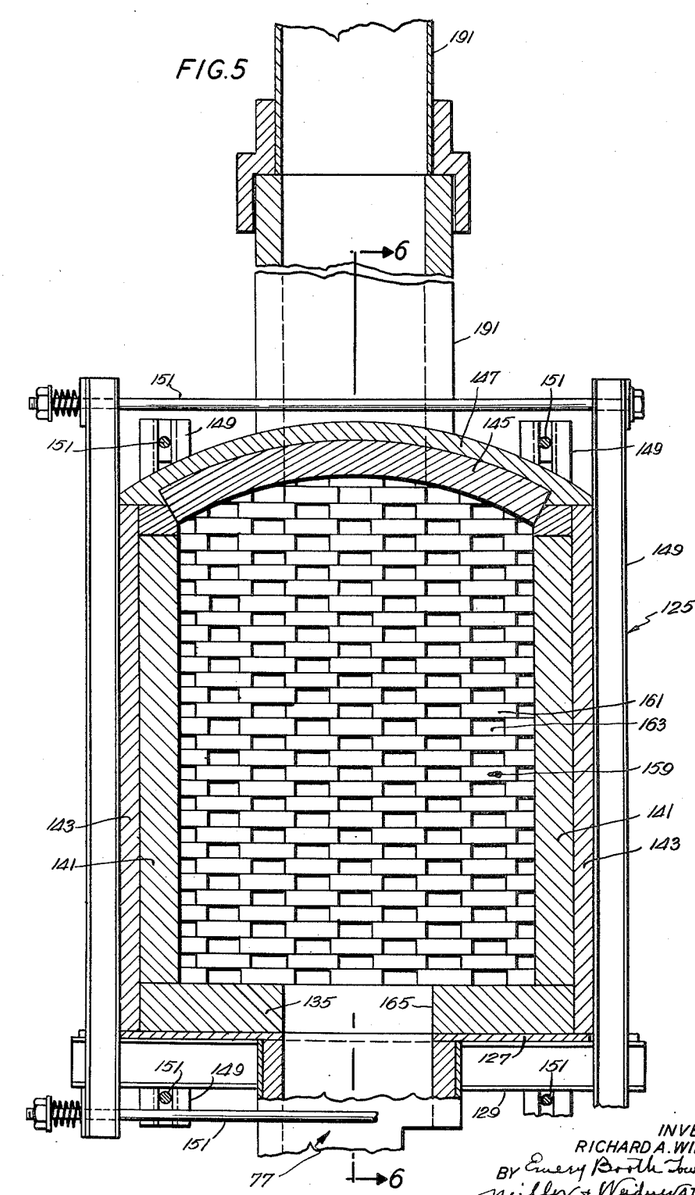
Fig. 5 is a section on the line 5—5 of Fig. 4.

As shown, the combustion chamber is divided lengthwise into three compartments 153, 155 and 157 by the partitions 159, which partitions are formed of heat refractory material, such as fire brick 161, laid checkerwise to provide apertures or passages 163 connecting the compartments of the combustion chamber at opposite sides thereof.

Figure 6:
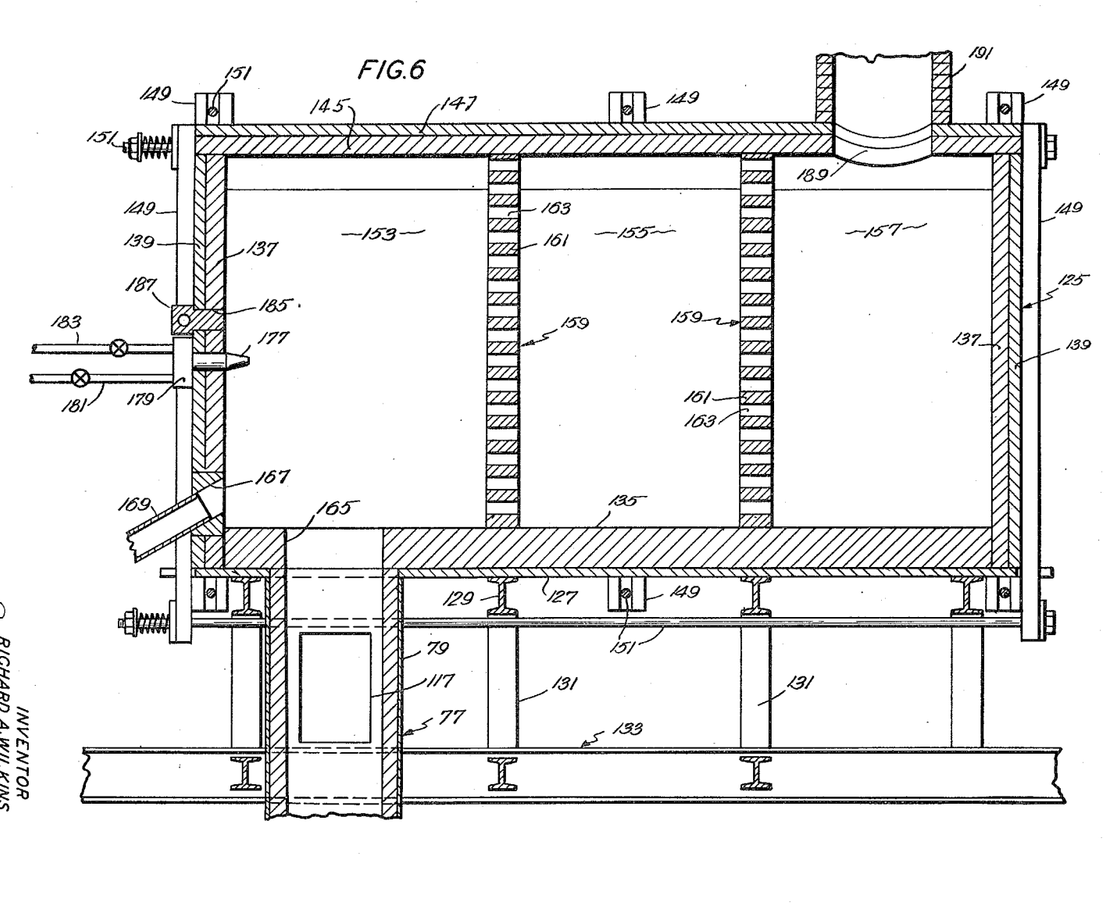
Fig. 6 is a section on the line 6—6 of Fig. 5.

The top of the internal chamber of the cupola is shown as registering with an opening 165 in the combustion chamber floor, so that the products of distillation and combustion in the cupola will discharge upwardly into the compartment 153 of the combustion chamber. As best shown in Figs. 4 and 6, that end wall 137, 139 of the combustion chamber which is adjacent the cupola is formed at its lower portion and directly opposite the opening 165 in the combustion chamber floor with an upwardly inclined opening 167, with which opening communicates a conduit 169. This conduit is supplied with combustion air under pressure by the blower 171, the conduit having therein a manually operated gate valve, schematically shown at 173, for regulating the blast of air discharged therefrom into the combustion chamber, while a pressure gauge 175 is provided for indicating the pressure of the air in the conduit.

The blast of air discharged from the conduit 169 into the compartment 153 of the combustion chamber strikes and mixes with the gaseous products of distillation and combustion discharged into that compartment from the cupola to add further air to them so that they may be completely burned, these products as hereinbefore explained normally igniting when opposite the charging opening of the cupola, through which opening air is drawn into the cupola. To insure ignition under untoward conditions the compartment 153 of the combustion chamber may be provided with a continuous burning flame of gas discharged with a combustible mixture shown, this nozzle is supplied with a combustible mixture of air and gas from a mixing chamber 179 which in turn is supplied with gas and compressed air through the valve controlled pipes 181 and 183, respectively. The combustible mixture for producing the gas flame may be ignited by a taper inserted through the opening 185 positioned adjacent the nozzle, which opening is normally closed by a removable plug 187.

The ignited combustible mixture, formed by admixture of the blast of air with gaseous products discharged vertically into the compartment 153 of the combustion chamber, turns to a horizontal direction and whirls, and then passes through the apertures or passages 163 of the checkerwork partitions 159 successively through the compartments 155 and 157. In the combustion chamber these products are completely burned, the products of combustion formed in the chamber passing from the compartment 157 through an opening 189 in the roof of the chamber into an elongated stack 191, from the top of which latter they discharge into the atmosphere.

The internal wall surfaces of the combustion chamber, particularly those of its side and end walls and its roof, and the checkerwork partitions 159, are heated to incandescence by the inferno of burning gases in the combustion chamber, the outer layers of heat insulating material of the side and end walls and roof acting to prevent loss of heat from those surfaces. These incandescent surfaces, and particularly the walls of the apertures or passages 163 of the checkerwork partitions, cause by contact with them consumption of the solid smoke forming particles in the gases discharged from the cupola, such particles consisting mainly of finely divided carbon produced by the destructive distillation in the cupola of the insulation of the copper wire that are carried upward by the rapid upward flow of gaseous combustion and distillation products in the cupola, and of smoke particles formed by such burning of the insulation in the cupola as may occur from time to time under untoward conditions. The checkerwork also divides into streams the gaseous products discharging from one compartment into the adjacent compartment of the combustion chamber, which streams as they discharge from the partitions mix and thus promote and maintain the mixture of those products with the combustion air and also prevent any stratification of the gaseous contents of the combustion chamber that might otherwise tend to occur.

As illustrated, the apparatus according to Figs. 4 to 7 does not employ a smoke arrester at the top of the stack, as the same ordinarily will not be necessary with a properly designed combustion chamber illustrated by those figures.

Satisfactory results have been secured with the apparatus according to Figs. 4 to 7 employing a combustion chamber about 7 feet wide, 20 feet long, and 9 feet high, a cupola chamber 37 inches inside diameter, the bottom of the tuyeres about 12 inches above the bottom lining of the furnace, the level of the carbon bed maintained about 24 inches above the top of the tuyeres, and the charging opening about 17 feet above the top of the tuyeres. Such apparatus, although its cupola has a cross-sectional area of only about 60 percent of the 48 inch diameter cupola according to the hereinbefore given specific example of apparatus according to Figs. 1 to 3, will handle about 4 tons, as compared to 2.5 tons, of insulated copper wire per hour, and in doing so effectively dispose of the gaseous distillation and combustion products from the cupola without discharge of smoke from the stack. If the 48 inch diameter cupola were employed with the combustion chamber according to Figs. 4 to 7 the apparatus would handle about 6.5 tons of insulated copper wire per hour without formation of smoke. On the other hand, if the 37 inch diameter cupola were employed with the combustion chamber of the hereinbefore given specific example of apparatus according to Figs. 1 to 3 the apparatus would handle only about 1.5 tons of insulated copper wire per hour without discharge of smoke from the stack.

It will be understood that within the scope of the appended claims wide deviations may be made in the forms of the invention described without departing from the spirit of the invention.

I claim:

1. The method of recovering copper from copper wire having an insulating covering comprising organic material of the character described, which method comprises forming a vertically extending confined column-like mass of such wire; causing combustion of carbonaceous material adjacent the bottom of said mass in combustion air supplied in such amounts as to secure adjacent said bottom a temperature above the melting point of copper for melting the copper wire thereat and produce hot gaseous products of combustion that are deoxidizing in respect to copper; passing said hot products of combustion upward through said mass for, in conjunction with the heat generated by such combustion, subjecting above the zone of such combustion said organic material to destructive distillation for reducing such material to carbonaceous material without igniting said organic material, or igniting the gaseous products of such distillation or gaseous products of said combustion while in contact with the portions of said mass above said zone of combustion and below the top of said mass; conducting the molten copper away from the bottom of said mass and causing the combustion air supplied to be in such amount as will burn all the carbonaceous material descending with the copper of said wire to the bottom of said mass, whereby to cause such descent of said wire and such carbonaceous material; and charging fresh wire to the top of said column-like mass to maintain such column whereby to effect continuous distilling and melting operations.

2. The method according to claim 1 in which the column-like mass of wire rests on and is supported by a bed of carbonaceous material and the amount of carbonaceous material produced as a result of the distilling operation is in excess of that necessary to effect the melting operation, and in which the combustion air is supplied at such rate as to burn all such carbonaceous material so produced for maintaining the bottom of the column-like mass at a substantially predetermined level.

3. The method according to claim 1 in which the column-like mass of wire rests at its bottom on and is supported by a bed of carbonaceous material, the combustion air being admitted to said bed below the interface of said mass and bed.

4. The method according to claim 1 in which the column-like mass of wire rests at its bottom on and is supported by a bed of carbonaceous material, the combustion air being admitted to said bed below the interface of said mass and bed, and the molten copper is conducted downward through said bed in contact therewith for subjecting such copper to a fire refining operation.

5. The method according to claim 1 in which the insulation of the copper wire contains mineral substance, flux being added to the charge for slagging such substance, and separating from the molten copper the slag so produced.

6. The method according to claim 1 in which the amount of carbonaceous material produced by the distilling operation is in excess of that necessary to effect the melting and distilling operations and such excess is of small particle size, and the column-like mass of wire rests on and is supported by a bed of carbonaceous material comprising an accumulation of such excess, and also in which the combustion air is admitted in the form of a blast below the top of said carbonaceous bed and at such rate as to burn all further carbonaceous material tended to be added to said bed from above, and adding to the wire charged to the top of the column-like mass of wire solid carbonaceous material, such as coke or anthracite coal, of such substantial particle size and in such small amounts as will, when it descends to adjacent the bottom of said mass, form on said carbonaceous bed a layer acting to prevent the finely divided carbonaceous material of such bed from floating on said blast whereby to prevent the blast from unduly elevating the zone of combustion.

7. The method according to claim 1 in which the amount of carbonaceous material produced by the distilling operation is in excess of that necessary to effect the melting and distilling operations and such excess is of small particle size, and the column-like mass of wire rests on and is supported by a bed of carbonaceous material comprising an accumulation of such excess, and also in which the combustion air is admitted in the form of a blast below the top of said carbonaceous bed and at such rate as to burn all further carbonaceous material tended to be added to said bed from above, and adding to the wire charged to the top of the column-like mass of wire solid meltable material, such as solid slag, of such substantial particle size and in such small amounts as will, when it descends to adjacent the bottom of said mass, form on said carbonaceous bed a meltable layer of solid material, acting to prevent such finely divided carbonaceous material from floating on said blast whereby to prevent the blast from unduly elevating the zone of combustion.

8. The method of recovering copper from copper wire having an insulating covering comprising organic material of the character described, utilizing a cupola furnace having tuyeres for entering combustion air through its side walls at its lower portion and having a charging opening above said tuyeres, which method comprises maintaining a bed of incandescent carbonaceous material at the lower portion of the furnace to a level above said tuyeres; charging the insulated wire to the cupola through the charging opening; subjecting the charged wire to destructive distillation to reduce organic material of such covering to carbonaceous material; melting the copper of the wire having such reduced organic material; the effecting of the melting of the copper comprising causing combustion of such carbonaceous material, adjacent the interface of the charged wire and said bed, in combustion air admitted through said tuyeres in such amounts that the products of combustion are essentially a mixture of hot carbon dioxide, carbon monoxide and nitrogen, and substantially all the carbonaceous material produced by such distillation and descending with the wire to said bed is burned during the continuance of such combustion; the distillation being effected at least in part by passing such hot products of combustion upward through such charge of wire.

9. The method of recovering copper from copper wire having an insulating covering comprising organic material of the character described, utilizing a cupola furnace having tuyeres for entering combustion air through its side walls at its lower portion and having a charging opening at an elevated position above said tuyeres, which method comprises maintaining a bed of incandescent carbonaceous material at the lower portion of said furnace to a level above but close to said tuyeres; maintaining an elongated column of the wire resting on said bed by charging such wire through said charging opening; subjecting to destructive distillation the insulation of said wire of said column to reduce it to carbonaceous material; melting the copper of said wire adjacent said bed after the insulation of said wire has been so reduced, and causing the melted copper to trickle downward through said bed to the bottom of the cupola and tapping it therefrom; the effecting of the melting of said wire comprising causing combustion of the carbonaceous material of said bed adjacent the interface of said column and bed in combustion air admitted through said tuyeres in such amounts that the products of combustion are essentially carbon dioxide, carbon monoxide and nitrogen, and substantially all such carbonaceous material produced by such distillation and descending with the wire to said bed is burned during the continuance of such combustion to maintain the top of said bed at substantially a predetermined level; the distillation being effected by the passage of the hot gaseous combustion products upward through said column of wire, augmented by the heat generated by such combustion; causing said combustion products admixed with the gaseous products of such distillation to discharge from the top of said column of wire into a combustion chamber, and, in said chamber, mixing said products with combustion air and burning them for disposing of them and eliminating such solid smoke forming particles as may be contained therein.

10. Apparatus for recovering copper from copper wire having an insulating covering comprising organic material of the character described, and disposing of said covering, comprising a cupola furnace having tuyeres adjacent its bottom in spaced relation thereto for entering combustion air thereinto, the bottom portion of said furnace being adapted to maintain a bed of carbonaceous material extending upward to a position above said tuyeres in adjacent relation thereto, the furnace also having a charging opening in its side walls above said tuyeres for entering insulated wire into said furnace for forming and maintaining on said bed an elongated column of the wire, and having means for tapping molten copper and slag therefrom adjacent the bottom of the furnace below said tuyeres, whereby combustion of carbonaceous material adjacent the interface of said bed and column may form hot gaseous combustion products which rise through said column and, at an elevation above the zone of such combustion, destructively distill said organic material to reduce it to carbonaceous material, which carbonaceous material may descend toward said interface with the copper of said wire where it is burned and the copper is melted and descends to the bottom of said bed and is tapped from said furnace adjacent said bottom, while the gaseous products of such distillation mixed with said gaseous combustion products may discharge from the top of said column; means above said charging opening forming a combustion chamber communicating with the portion of said cupola furnace above said charging opening for upward flow of such gaseous mixture past said charging opening into said chamber for supplying air through said opening from the exterior of said cupola furnace to such mixture as the latter so passes said opening; means for entering a blast of air into said combustion chamber for admixture with said gaseous mixture therein, whereby to form a combustible mixture in said combustion chamber; said combustion chamber having provision for the igniting of said combustible mixture, the combustion chamber extending horizontally, and laterally of the cupola furnace; the means of communication between the cupola furnace and said combustion chamber discharging into said chamber laterally thereof in respect to the horizontal extent of said chamber; and means forming a chimney stack in communication with said combustion chamber at a point remote from that of discharge into said chamber from the cupola furnace.

11. Apparatus according to claim 10 in which the means for entering combustion air into the combustion chamber discharges thereinto adjacent the point of discharge thereinto from the cupola furnace; and means in said combustion chamber, positioned in the path of flow of the gaseous products in said chamber and presenting walls of refractory material adapted to be heated to incandescence by the burning of the combustible mixture in said chamber, for dividing the gaseous products in said chamber into streams contacting such walls for facilitating burning of solid particles contained in said mixture.

12. Apparatus according to claim 10 in which the means for entering combustion air into the combustion chamber discharges thereinto adjacent the point of discharge thereinto from the cupola furnace; and a partition in said combustion chamber between the point of entry thereinto of gaseous products from the cupola furnace and the point of discharge therefrom to said stack, which partition is of refractory material adapted to be heated to incandescence by the burning of the combustible mixture in said chamber and is formed with perforations for passage of the gaseous products flowing through said chamber, whereby to facilitate burning of solid particles contained in said gaseous products and secure an improved mixture of said gaseous products.

13. Apparatus according to claim 10 in which the top of the cupola furnace communicates with an opening in the bottom of the combustion chamber adjacent one end wall thereof; a conduit opening through said end wall adjacent its lower portion for discharging an upwardly inclined blast of combustion air into the stream of gaseous products discharging into said combustion chamber from the cupola furnace for mixture with said stream; the chimney stack communicating with an opening formed in the wall of said combustion chamber adjacent its end opposite said cupola furnace for discharge of combustion products from said chamber; a vertical checkerwork partition in said combustion chamber between the opening thereinto from the cupola furnace and the opening therefrom into said stack, which partition is of refractory brick adapted to be heated to incandescence by the burning of the combustible mixture in said chamber; and the burning mixture being adapted to flow through the openings of said checkerwork, whereby to facilitate combustion of solid particles contained in said mixture.

References Cited in the file of this patent

UNITED STATES PATENTS

| | | |
|---|---|---|
| 177,028 | Stephens | May 2, 1876 |
| 717,093 | Greenawalt | Dec. 30, 1902 |
| 1,869,886 | Derr | Aug. 2, 1932 |
| 1,884,088 | Miller | Oct. 25, 1932 |
| 2,124,860 | Miller | July 26, 1938 |
| 2,574,740 | Hartman | Nov. 13, 1951 |